United States Patent
Tabak

(10) Patent No.: US 9,646,650 B2
(45) Date of Patent: May 9, 2017

(54) AUTOMATICALLY SYNCING RECORDINGS BETWEEN TWO OR MORE CONTENT RECORDING DEVICES

(71) Applicant: Google Inc., Mountain View, CA (US)

(72) Inventor: Joshua Abraham Tabak, San Francisco, CA (US)

(73) Assignee: GOOGLE INC., Mountain View, CA (US)

(*) Notice: Subject to any disclaimer, the term of this patent is extended or adjusted under 35 U.S.C. 154(b) by 165 days.

(21) Appl. No.: 13/903,706

(22) Filed: May 28, 2013

(65) Prior Publication Data

US 2014/0355951 A1 Dec. 4, 2014

(51) Int. Cl.
| | |
|---|---|
| *H04N 9/80* | (2006.01) |
| *G11B 27/10* | (2006.01) |
| *G11B 27/28* | (2006.01) |
| *G11B 27/30* | (2006.01) |
| *H04N 5/765* | (2006.01) |
| *H04N 9/82* | (2006.01) |
| *G11B 27/34* | (2006.01) |

(52) U.S. Cl.
CPC ............ *G11B 27/10* (2013.01); *G11B 27/28* (2013.01); *G11B 27/3027* (2013.01); *G11B 27/3036* (2013.01); *H04N 5/765* (2013.01); *H04N 9/8205* (2013.01); *G11B 27/34* (2013.01)

(58) Field of Classification Search
CPC ..... G11B 27/10; H04N 5/765; H04N 5/23203
USPC ......................................................... 386/241
See application file for complete search history.

(56) References Cited

U.S. PATENT DOCUMENTS

| | | | | |
|---|---|---|---|---|
| 6,934,461 | B1* | 8/2005 | Strub et al. .................... | 386/241 |
| 7,139,018 | B2* | 11/2006 | Grosvenor et al. ......... | 348/211.3 |
| 8,542,255 | B2* | 9/2013 | Bhatt ................... | H04N 9/8205 |
| | | | | 345/676 |
| 2010/0220978 | A1* | 9/2010 | Ogikubo .......................... | 386/95 |
| 2010/0296571 | A1 | 11/2010 | El-Saban et al. | |
| 2011/0271213 | A1 | 11/2011 | Newman et al. | |
| 2012/0162436 | A1* | 6/2012 | Cordell et al. .......... | G11B 27/10 |
| | | | | 348/158 |
| 2012/0263439 | A1 | 10/2012 | Lassman et al. | |
| 2013/0121668 | A1 | 5/2013 | Meaney et al. | |
| 2013/0147623 | A1* | 6/2013 | Somasundaram et al. ... | 340/540 |
| 2014/0079372 | A1 | 3/2014 | Zhang et al. | |

FOREIGN PATENT DOCUMENTS

WO 2010131105 11/2010

OTHER PUBLICATIONS

"Method and system for sharing and collectively authoring video clips taken by multiple handheld devices," 3 pages.

(Continued)

*Primary Examiner* — Thai Tran
*Assistant Examiner* — Jose Mesa
(74) *Attorney, Agent, or Firm* — Lowenstein Sandler LLP

(57) ABSTRACT

This disclosure generally relates to systems and methods that facilitate synchronizing recordings between a plurality of content recording devices using embedded markers or metadata, and employing the synchronized recordings on a content recording device or a content server to present one or more of the synchronized recordings concurrently in a merged presentation or in a manner that allows for switching between recordings while maintaining synchronization.

27 Claims, 15 Drawing Sheets

(56) References Cited

OTHER PUBLICATIONS

"Method and system for sharing and collectively authoring video clips taken by multiple handheld devices," May 2, 2011, 4 pages.
International Search Report and Written Opinion for PCT Application Serial No. PCT/US2014/036346, dated Dec. 8, 2014, 19 pages.
Jun, Zhou, et al., "Synchronous Locating for Multi-View Video Broadcast with Time-Shifted Functionality," International Conference on Biomedical Engineering and Computer Science (ICBECS), 2010, IEEE, Piscataway, NJ, Apr. 23, 2010, pp. 1-4.
Kim, Seong-Won, et al., "Programmable Genlocking Video Analog-to-Digital Converter for Multimedia Applications," Consumer Electronics, IEEE International Conference on Digest of Technical Papers, IEEE, Jun. 21, 1994, pp. 310-311.
Tabatabai, A., et al., "A Method for Synchronization between Media Delivery Time and MPEG-7 Content Description Delivery Times," Motion Picture Expert Group, Jul. 2001, Sydney, Australia.
Dufaux, Frederic, et al., "Recent advances in MPEG-7 cameras," Proceedings of SPIE, vol. 6312, Aug. 6, 2006, pp. 1-8.

\* cited by examiner

US 9,646,650 B2

AUTOMATICALLY SYNCING RECORDINGS BETWEEN TWO OR MORE CONTENT RECORDING DEVICES

TECHNICAL FIELD

This disclosure generally relates to systems and methods that facilitate synchronizing recordings among a plurality of content recording devices using embedded markers or metadata, and employing the synchronized recordings on a content recording device or a content server to present one or more of the synchronized recordings concurrently in a merged presentation or in a manner that allows for switching between recordings while maintaining synchronization.

BACKGROUND OF THE INVENTION

As mobile content recording devices have become ubiquitous, oftentimes, a common event is recorded concurrently by a plurality of device users. For example, during a concert, sports game or newsworthy event, respective attendees may record the event from different perspectives. However, the attendees may not be aware of the other device users recording the event, or if they are aware, don't have access to their recordings. Furthermore, even if they had access to the other users' recordings, they have to manually try to align the other users' recordings to their own recording of the event in order to view the recordings concurrently or merge them together.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, input indicating a synchronized recording request is received by a content recording device including a processor, and in response to receiving the synchronized recording request: a synchronized recording relationship is established with at least one other content recording device that includes temporal synchronization between the content recording device and the at least one other content recording device, at least one marker is inserted into a recording being captured by the content recording device; and the at least one other content recording device is instructed to insert at least one other marker into the at least one other recording being captured by the at least one other content recording device, wherein the at least one other marker is temporally synchronized with the at least one marker.

In accordance with a non-limiting implementation, a content recording device, comprises an interface component configured to receive input indicating a synchronized recording request; and a content recording component configured to, in response to receiving the synchronized recording request: establish a synchronized recording relationship with at least one other content recording device that includes temporal synchronization between the content recording device and the at least one other content recording device; insert at least one marker into a recording being captured by the content recording device; and instruct the at least one other content recording device to insert at least one other marker into the at least one other recording being captured by the at least one other content recording device, wherein the at least one other marker is temporally synchronized with the at least one marker.

In accordance with another non-limiting implementation, a subset of a plurality of recordings having respective markers are accessed, wherein the respective markers are temporally synchronized between the plurality of recordings, and wherein the subset comprises at least two of the plurality of recordings; and the subset of recordings are time synchronized based upon the respective markers.

In accordance with a further non-limiting implementation, a content server component is configured to access a subset of a plurality of recordings having respective markers, wherein the respective markers are temporally synchronized between the plurality of recordings, and wherein the subset comprises at least two of the plurality of recordings; and a content synchronization component is configured to time synchronize the subset of recordings based upon the respective markers.

These and other implementations and embodiments are described in more detail below.

DETAILED DESCRIPTION

Overview

Figure 1:
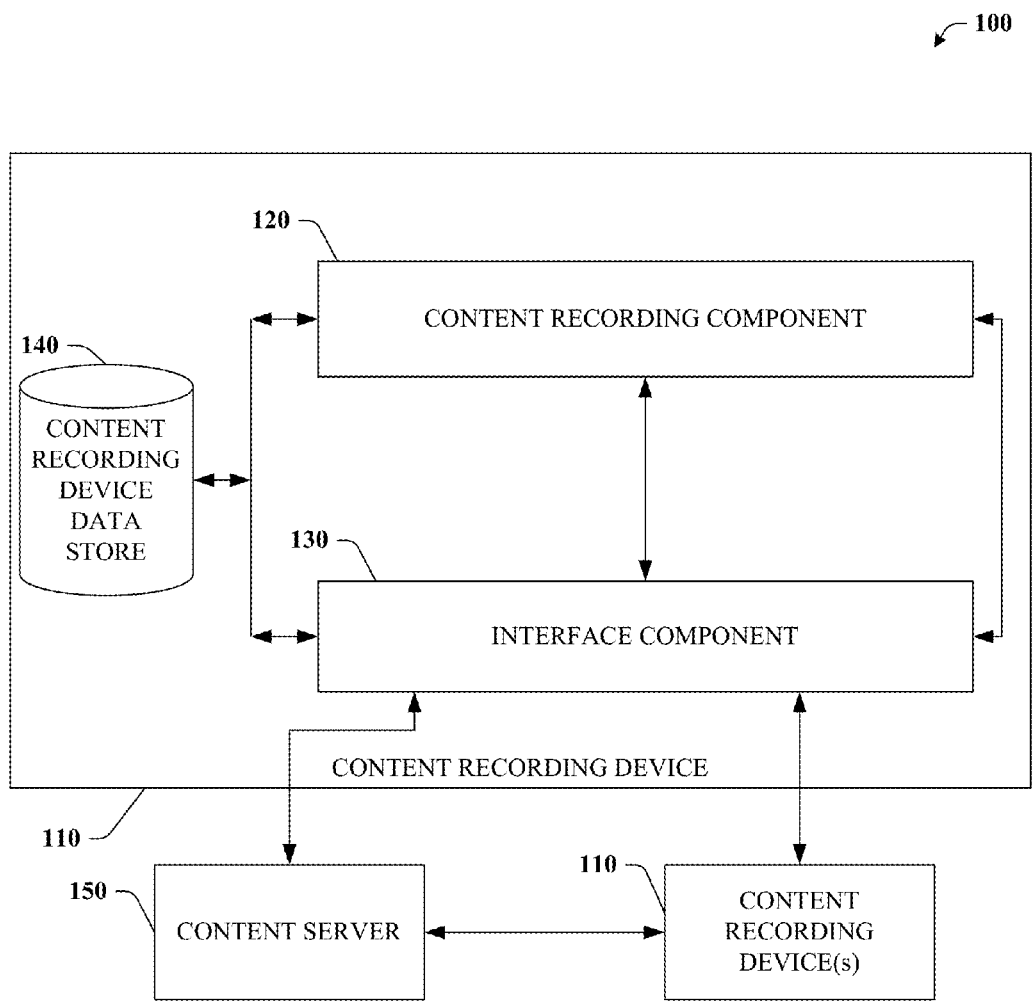
FIG. 1 illustrates a block diagram of an exemplary non-limiting system for generating recordings in a synchronized manner amongst a plurality of content recording devices in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In situations in which systems and methods described here collect personal information about users, or may make use of personal information, the users can be provided with an opportunity to control whether programs or features collect user information (e.g., information about a user's social network, social actions or activities, profession, a user's preferences, or a user's current location), or to control whether or how to receive content from the content server that may be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. The user can add, delete, or modify information about the user. Thus, the user can control how information is collected about the user and used by a server.

In accordance with various disclosed aspects, a mechanism is provided for a content recording device to interact with one or more other content recording devices to establish synchronized recording. For example, a user can be watching an event and enable a recording application on a content recording device. The recording application can present the user with an option to initiate a synchronized recording with other content recording devices, for example, near the event and within wireless communication. The respective recordings of the content recording devices can have metadata or embedded markers added to allow for synchronization of the recordings. Additionally, the content recording devices can interact with a content server to store respective recordings of the event. The content server can synchronize the recordings using the metadata or markers and present one or more of the synchronized recordings, concurrently, in a merged presentation or in a manner that allows for switching between recordings while maintaining synchronization.

Recording (or content) can include, for example, video, audio, image, text, or any combination thereof. Recordings can be available on an intranet, internet, or can be local content.

With reference to the embodiments described below, an example content recording device recording video content is presented for illustrative purposes only. It is to be appreciated that any suitable type of content can be employed.

Content Recording Device

Referring now to the drawings, FIG. 1 depicts a system 100 for generating recordings in a synchronized manner amongst a plurality of content recording devices 110. System 100 includes a plurality of content recording devices 110 capable of recording content. System 100 also includes content server 150 that can receive recordings from the plurality of content recording devices 110. While content server 150 is depicted as a distinct device in this embodiment, it is to be appreciated that in another embodiment content recording device 110 can act as a content server 150 for one or more other content recording devices 110, thus not requiring a separate content server 150 device. Content recording device 110 also includes a content recording component 120 that records content for content recording device 110 and establishes synchronized recordings with other content recording devices 110. In addition, content recording device 110 includes an interface component 130 that interacts with other content recording devices 110 or content server 150 to send and/or receive information related to recording content. Additionally, content recording device 110 includes a content recording device data store 140 that can store content, as well as, data generated or received by content recording device 110, content recording component 120, and interface component 130. Content recording device data store 140 can be stored on any suitable type of storage device, non-limiting examples of which are illustrated with reference to FIGS. 14 and 15.

While only one content server 150 is shown, content recording device 110 can interact with any suitable number of content servers 150 concurrently. In addition, content recording device 110 can interact with any suitable number of other content recording devices 110 concurrently. Furthermore, content recording device 110 and content server 150 can respectively receive input from users to control recording, interaction with, and presentation of content and associated information, for example, using input devices, non-limiting examples of which can be found with reference to FIG. 15.

Figure 15:
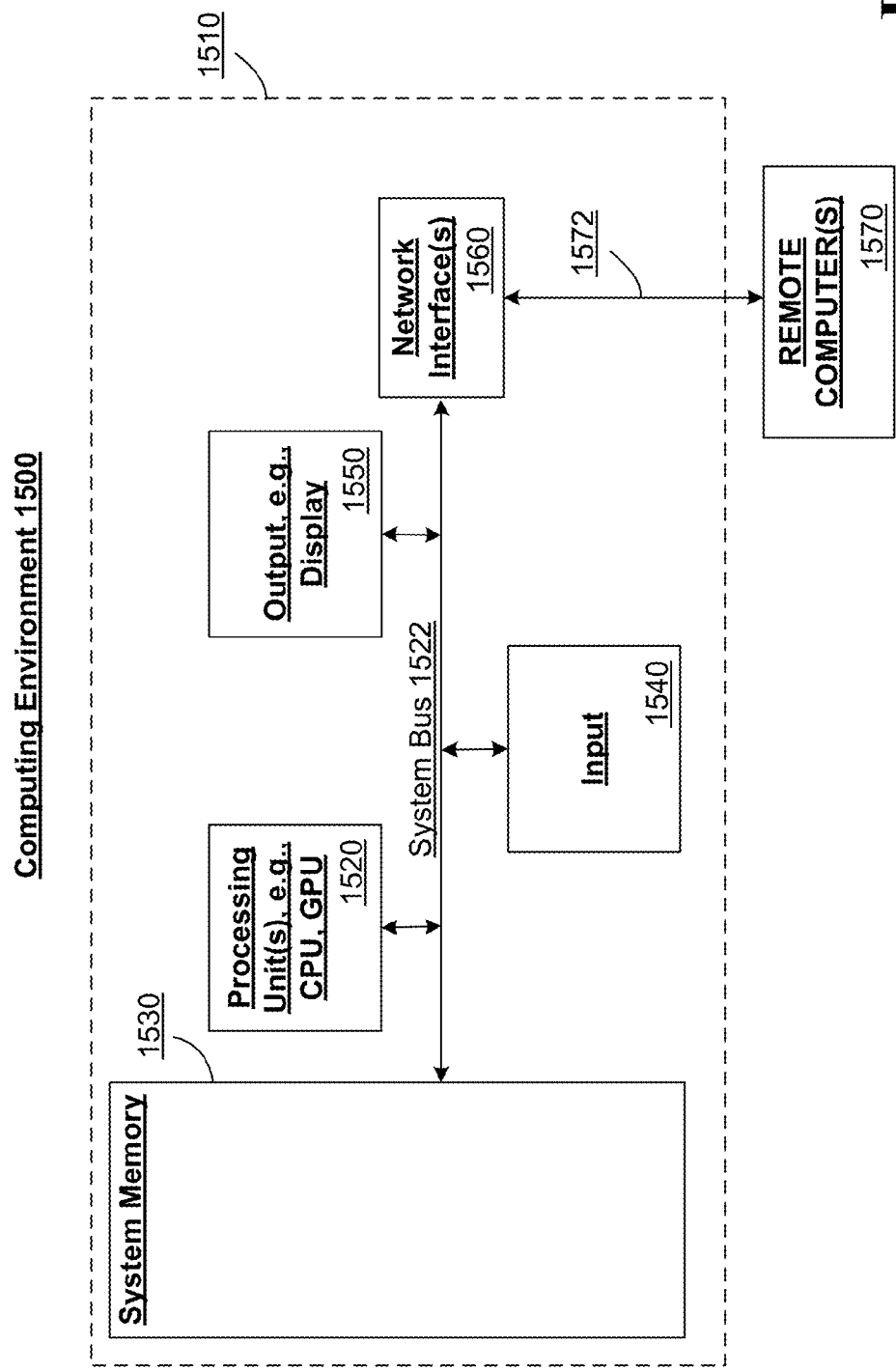
FIG. 15 illustrates a block diagram of an exemplary non-limiting computing system or operating environment in which the various embodiments can be implemented.

Content recording device 110 and content server 150, each respectively include a memory that stores computer executable components and a processor that executes the computer executable components stored in the memory, a non-limiting example of which can be found with reference to FIG. 15. Content recording device 110 can communicate via a wired and/or wireless network with content server 150 or other content recording devices 110.

Content recording device 120 can be any suitable type of device for recording, interacting with, receiving, accessing, or supplying content locally, or remotely over a wired or wireless communication link, non-limiting examples of include a wearable device or a non-wearable device. Wearable device can include, for example, heads-up display glasses, a monocle, eyeglasses, contact lens, sunglasses, a headset, a visor, a cap, a helmet, a mask, a headband, clothing, camera, video camera, or any other suitable device capable of recording content that can be worn by a human or non-human user. Non-wearable device can include, for example, a mobile device, a mobile phone, a camera, a camcorder, a video camera, personal data assistant, laptop computer, tablet computer, desktop computer, server system, cable set top box, satellite set top box, cable modem, television set, monitor, media extender device, blu-ray device, DVD (digital versatile disc or digital video disc) device, compact disc device, video game system, portable video game console, audio/video receiver, radio device, portable music player, navigation system, car stereo, motion sensor, infrared sensor, or any other suitable device capable of recording content. Moreover, content recording device 110 and content server 150 can include a user interface (e.g., a web browser or application), that can receive and present displays and content generated locally or remotely.

Figure 2:
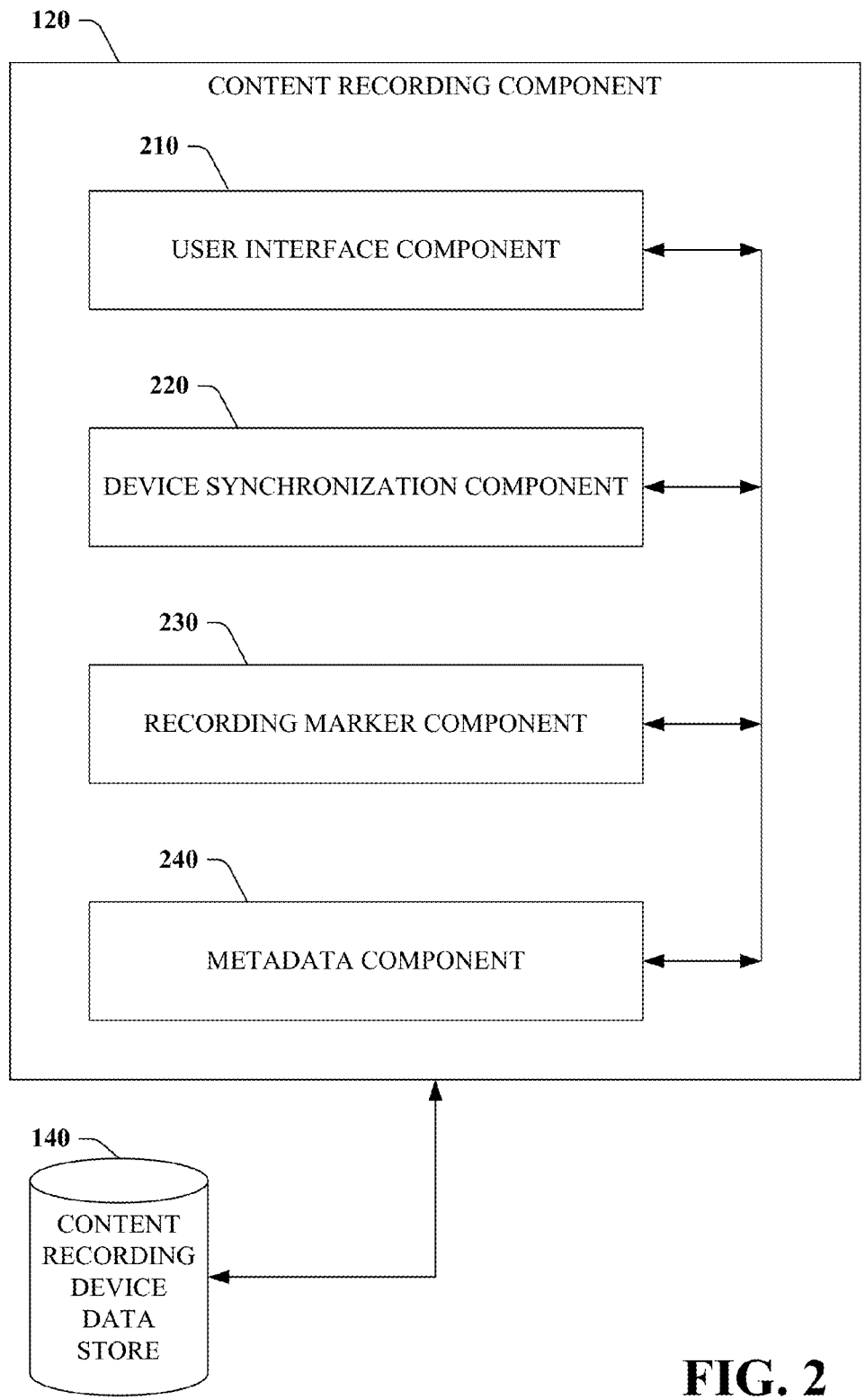
FIG. 2 illustrates a block diagram of an exemplary non-limiting content recording component that manages synchronized recording of content for a content recording device in accordance with an implementation of this disclosure.

Referring to FIG. 2, content recording component 120 manages synchronized recording of content for content recording device 110. Content recording component 120 includes a user interface component 210 that receives user input and presents displays related to initiating or terminating recording of content. For example, a user may be watching a concert and enter or select a command via an input device that interacts with user interface component 210 to activate a recording application on content recording device 110. Content recording component 120 also includes a device synchronization component 220 that manages establishing of synchronized recording between content recording devices 110, and initiation or termination of synchronized recordings. In addition, content recording component 120 includes a recording marker component 230 that generates one or more markers for synchronization of recordings on content recording devices 110. Furthermore, content recording component 120 includes a metadata component 240 that generates metadata for recordings on content recording device 110.

Figure 6A:
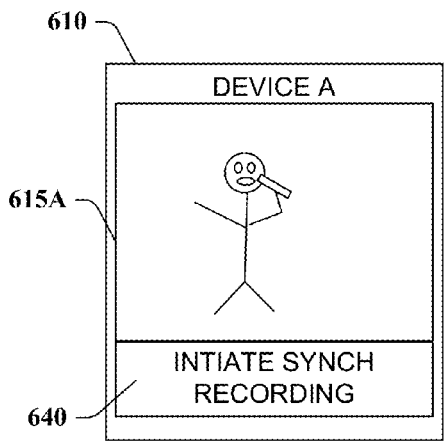
FIG. 6A illustrates a block diagram of an exemplary non-limiting a content recording device with a recording application displayed in accordance with an implementation of this disclosure.

Content recording component 120, for example, can initiate recording of content by receiving input to activate a recording application on content recording devices 110. In another example, the process of recording content can be activated automatically according to predefined or user specified criteria. Referring to FIG. 6A, in accordance with non-limiting example, a content recording device A 610 is depicted with a recording application 615A. Conventional elements of a recording application are not shown as they are well known to those skilled in the art. Recording application 615A can present an initiate synchronized recording 640 element that is selectable to activate synchronized recording. User interface component 210 can recognize selection of the initiate synchronized recording 640 element and instruct device synchronization component 220 to activate synchronized recording on content recording device 110.

Figure 3:
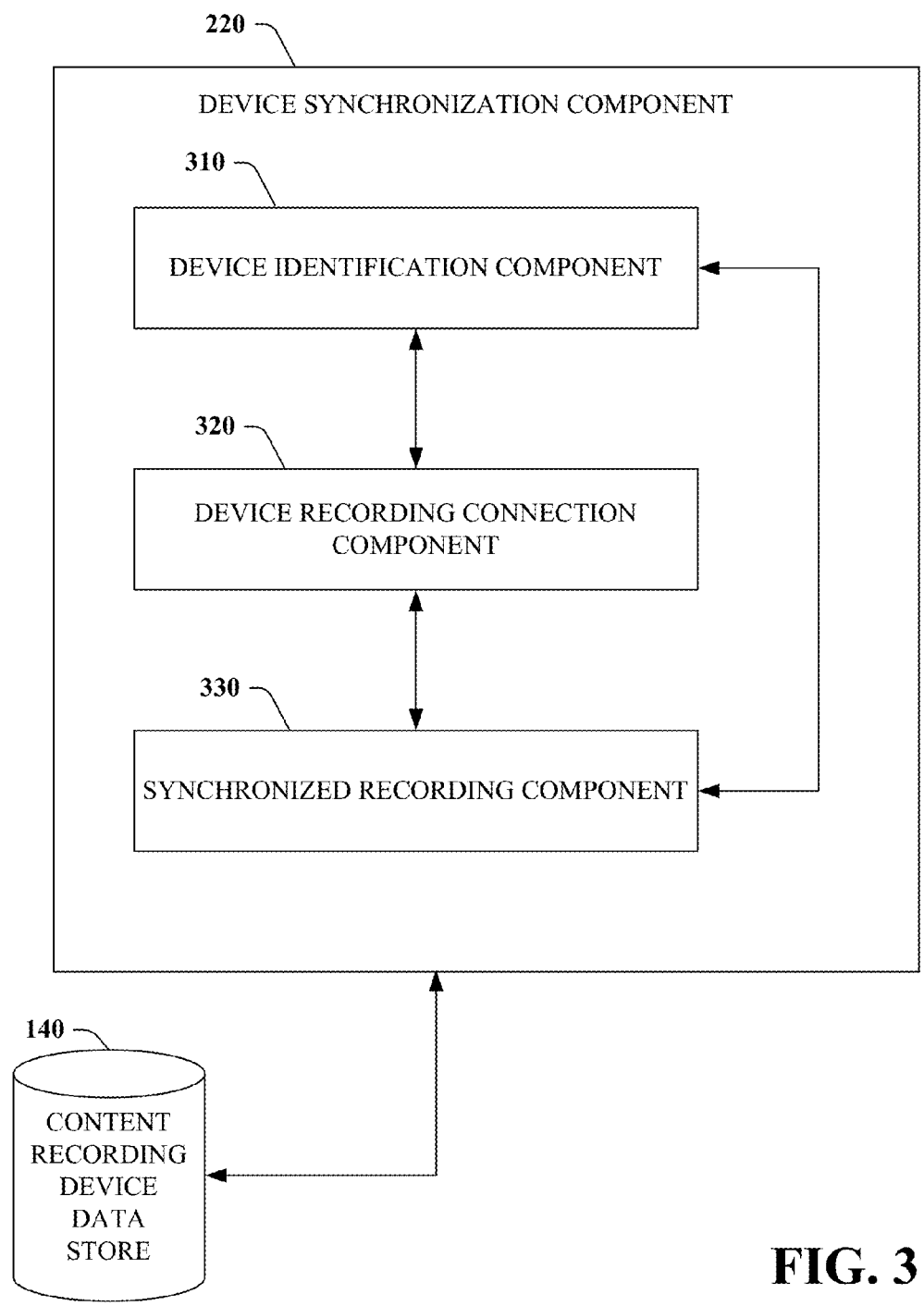
FIG. 3 illustrates a block diagram of an exemplary non-limiting device synchronization component that manages establishing of synchronized recording between content recording devices in accordance with an implementation of this disclosure.

Referring to FIG. 3, device synchronization component 220 includes device identification component 310 that identifies other content recording devices 110 to which a synchronized recording relationship can be established. Device synchronization component 220 includes device recording connection component 320 that establishes a synchronized recording relationship with other content recording devices 110. In addition, device synchronization component 220 includes synchronized recording component 330 that manages synchronized recording with the other content recording devices 110 with which a synchronized recording relationship has been established. It is to be appreciated that the other content recording devices 110 can have a content recording component 120 that manages synchronized recording.

Figure 6B:
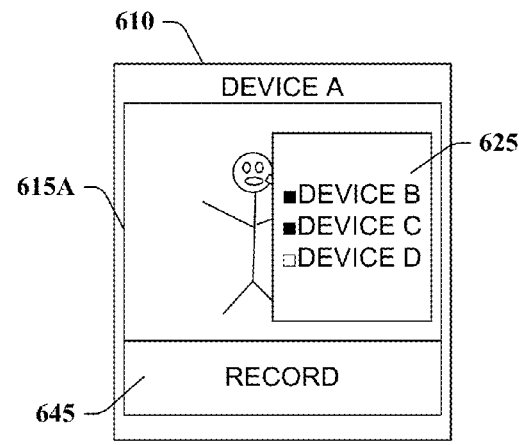
FIG. 6B illustrates a block diagram of an exemplary non-limiting content recording device with a recording application displayed after having an initiate synchronized element selected in accordance with an implementation of this disclosure.

Device identification component 310 employs one or more wireless and/or wired connections to identify other content recording devices 110 to which a synchronized recording relationship can be established. For example, a mobile phone can employ wireless communication, such as Bluetooth, 802.11a/b/g/n, near field communication (NFC), Global System for Mobile Communications (GSM), Code division multiple access (CDMA), General packet radio service (GPRS), Universal Mobile Telecommunications System (UMTS), Long Term Evolution (LTE), Enhanced Data rates for GSM Evolution (EDGE), Wideband Code Division Multiple Access (W-CDMA), Time Division Synchronous Code Division Multiple Access (TD-SCDMA), Worldwide Interoperability for Microwave Access (WiMAX), Long Term Evolution Advanced, Evolved High-Speed Packet Access, infrared, lightwave or optical based standard, or any other suitable wireless communication standard, to identify content recording devices nearby. Device identification component 310 can perform identification by applying one or more predefined and/or user specified filters to the other content recording devices 110. In a non-limiting example, the filters can include geographical parameters (e.g. distance, global positioning coordinates, city, or any other suitable geography based parameter), recording parameters (e.g., aspect ratio, resolution, color, frame rate, bit rate, encoding format, capture format, or any other suitable parameter associated with recording content), user relationship parameter (e.g. social network connections, friends, family, coworkers, email contacts, or any other suitable parameter associated with established relationships amongst users), device type (e.g. such as the type of content recording device), maximum number or devices to identify, or any other suitable parameter that can be employed for a predefined or user specified filter. For example, a user can specify that they only want to have other content recording devices 110 identified that are within a threshold distance from their content recording device 110, are a friend of theirs in a social network, can record high definition 1080p content, and are using a mobile phone. It is to be appreciated that device identification component 310 can rank the identified other content recording devices 110 based upon predefined or user specified ranking criteria. For example, a user can include a filter as indicated in the above example that further specifies to only identify the top 10 other content recording devices 110 according to ranking criteria that specifies closest distance. Additionally, weights can be applied to filter parameters or ranking criteria. Referring to FIG. 6B, in a non-limiting example, content recording device A 610 is depicted with recording application 615A displayed after having the initiate synchronized recording 640 element selected. Device identification component 310 on content recording device A 610 is shown to have identified three other content recording devices 110, DEVICE B, DEVICE C, and DEVICE D which are presented in recording application 615A. While only three other content recording devices 110 are illustrated in this example, any suitable number of other content recording devices 110 can be presented with appropriate navigation controls. In an embodiment, DEVICE B, DEVICE C, and DEVICE D are selectable by a user of recording application 615A to indicate which of the other content recording devices 110 the user would like to establish a synchronized recording relationship. In this example, DEVICE B and DEVICE C are selected as indicated by the black box next to those devices in the display, and DEVICE D is not selected as indicated by the white box next to that device in the display. A selectable record 645 element is also presented that the user can select once having chosen the other content recording devices 110 which initiates device recording connection component 320 to attempt to establish a synchronized recording relationship with the selected other content recording devices 110. It is to be appreciated that any suitable mechanism for presenting and selecting other content recording devices 110 can be employed. In another non-limiting example, device identification component 310 can automatically attempt to establish a synchronized recording relationship with other content recording devices identified and/or selected.

Figure 6C:
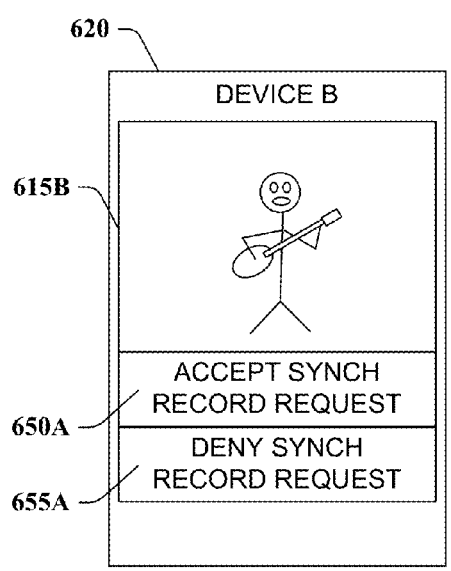
FIG. 6C illustrates a block diagram of an exemplary non-limiting content recording device with a recording application displayed having a selectable accept synch record request element and a selectable deny synch record request element in accordance with an implementation of this disclosure.
Figure 6D:
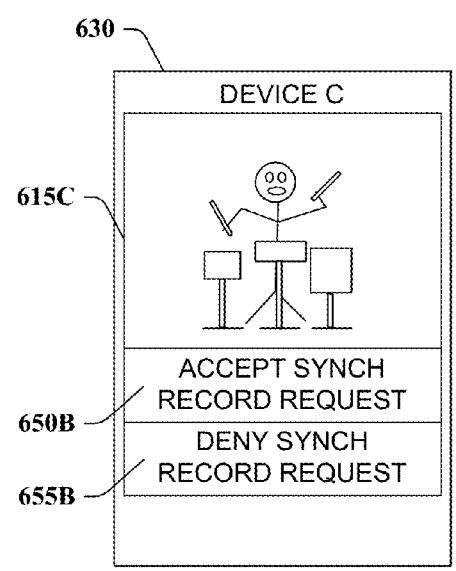
FIG. 6D illustrates a block diagram of an exemplary non-limiting content recording device with a recording application displayed having a selectable accept synch record request element and a selectable deny synch record request element in accordance with an implementation of this disclosure.

Device recording connection component 320 communicates with content recording device B 620 and content recording device C 630 to attempt to establish a synchronized recording relationship. Referring to FIG. 6C, content recording device B 620 is depicted with recording application 615B having a selectable accept synch record request 650A element that the user can select to establish a synchronized recording relationship with the content recording device A 610, and a selectable deny synch record request 655A element that the user can select to prevent establishing a synchronized recording relationship with the content recording device 610A. In FIG. 6D, content recording device C 630 is depicted with recording application 615C having a selectable accept synch record request 650B element that the user can select establish a synchronized recording relationship with the content recording device A 610, and a selectable deny synch record request 655B element that the user can select to prevent establishing a synchronized recording relationship with the content recording device A 610. It is to be appreciated that content recording device B 620 and content recording device C 630 can also have predefined or user selectable permission parameters that allow or restrict capabilities of content recording device A 610 in the established synchronized recording relationship. In a non-limiting example, permission parameters can include, automatic acceptance or denial of synchronized recording requests, recording settings (e.g. camera or camcorder visual or audio recording settings), recorded content access privileges, recorded content editing privileges, application access privileges, file transfer privileges, shared recorded content ownership privileges, recorded content distribution privileges, or any other suitable parameters associated with recording, accessing, editing, or distributing recorded content. For example, content recording device B 620 can have predefined permission settings that restrict content recording device A 610 from changing any settings on content recording device B 620 and further only allows content recording device A 610 to access recorded content once transferred to content server 150. In another example, content recording device C 630 can have predefined permission settings that allow content recording device A 610 to change recording settings and access recorded content on content recording device C 630. In addition, once a synchronized recording relationship is established between a content recording device 110 and other content recording devices 110, a synchronized recording relationship can be established between the other content recording devices 110 automatically or manually. For example, once content recording device A 610 establishes a synchronized recording relationship with content recording device B 620 and content recording device C 630, a synchronized recording relationship can be established between content recording device B 620 and content recording device C 630. In another example, content recording device B 620 and content recording device C 630 would need to establish a synchronized recording relationship with each other manually. It is to be appreciated that any suitable mechanism for establishing a synchronized recording relationship and permissions between content recording devices 110 can be employed. Additionally, communication acknowledgement, retry, and timeout mechanisms between content recording devices 110 can be employed when establishing a synchronized recording relationship. Furthermore, security mechanism can be employed when establishing a synchronized recording relationship between content recording devices 110, such as a password, a personal identification number (PIN) code, a Bluetooth pairing based mechanism, a key based mechanism, a certificate based mechanism, or any other suitable security mechanism.

Referring back to FIG. 3, synchronized recording component 330 can initiate synchronized recording on content recording device 110 and other content recording devices 110 once a synchronized recording relationship has been established. It is to be appreciated that one or more of content recording device 110 and other content recording devices 110 can already be recording content. In a non-limiting example, where content recording device 110 and other content recording devices 110 are not currently recording content, synchronized recording component 330 can instruct content recording device 110 and the other content recording devices 110 to initiate recording of content. In another non-limiting example, where one or more of content recording device 110 and the other content recording devices 110 are already recording content, synchronized recording component 330 instructs content recording device 110 or content recording devices 110 that are not currently recording content to initiate recording of content.

Figure 7A:
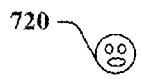
FIG. 7A illustrates a block diagram of an exemplary non-limiting token in accordance with an implementation of this disclosure.
Figure 7B:
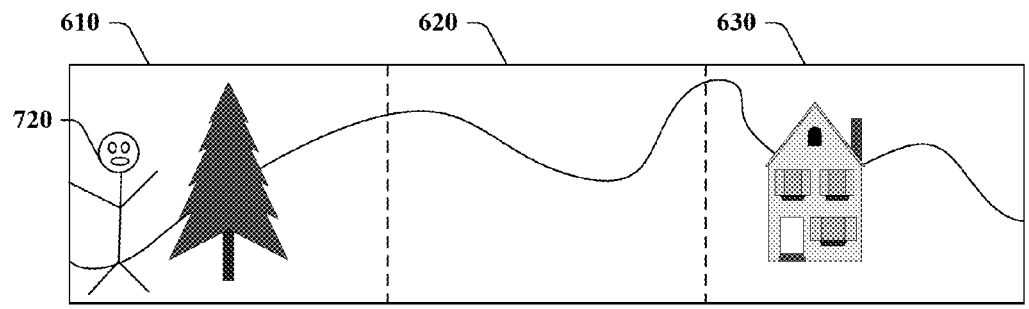
FIG. 7B illustrates a block diagram of an exemplary non-limiting respective views from recording applications in content recording devices focused on a different perspectives of a landscape scene in relation to token initiated recording in accordance with an implementation of this disclosure.

In another example, synchronized recording component 330 can employ a token to initiate synchronized recording on content recording device 110 and other content recording devices 110 once a synchronized recording relationship has been established. A token, in a non-limiting example, can be selected from a library or captured from an image or audio capturing device, such as a particular object or audio signal. For example, a token can be an image of an object, such as a particular face, car set of characters, flower, etc., that is selected from an internal or external image library, received from another device, or captured by a camera on content recording device 110. It is to be appreciated that any suitable object can be employed. In another example, a token can be an audio signal, such as recording of a particular voice, sound, or set of words, that is selected from an internal or external audio library, received from another device, or captured by a microphone on content recording device 110. It is to be appreciated that any suitable audio signal can be employed. In an embodiment, synchronized recording component 330 can recognize the token by visual or audio input (e.g. using visual recognition, audio recognition, or speech to text algorithms) and instruct content recording device 110 and other content recording devices 110 to initiate recording content. For example, referring to FIG. 7A, in a non-limiting example, token 720 of an image of a face is depicted. Referring to FIG. 7B in a non-limiting example, respective views from recording applications in content recording devices 610, 620, and 630 focused on a landscape scene are illustrated. When synchronized recording component 330 on content recording devices 610 recognizes token 720, it can instruct content recording devices 610, 620, and 630 to initiate recording content. This, for example, can be advantageous where content recording devices 610, 620, and 630 are employed for generating a panoramic recording when their respective content recordings are combined.

Figure 7C:
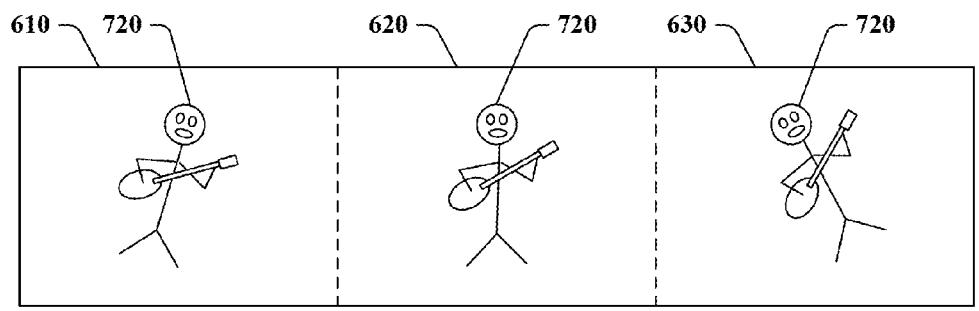
FIG. 7C illustrates a block diagram of an exemplary non-limiting respective views from recording applications in content recording devices focused on a stage from different locations at a concert event in relation to token initiated recording in accordance with an implementation of this disclosure.

In another embodiment, synchronized recording component 330 can communicate the token to other content recording devices 110. When each of content recording device 110 and other content recording devices 110 respectively recognizes the token by visual or audio input, they can respectively initiate recording of content. For example, referring to FIG. 7C, is depicted, in a non-limiting example, respective views from recording applications in content recording devices 610, 620, and 630 focused on a stage from different locations at a concert event. It is to be appreciated that, in this example, the views depicted do not have to be at the same time, but when the token 720 is within view of the respective content recording devices 610, 620, and 630. When respective synchronized recording components 330 on content recording devices 610, 620, and 630 recognize token 720 (e.g. face of the guitar player), they can instruct respective content recording devices 610, 620, and 630 to initiate recording content. This, for example, can be advantageous when the object desired to be recorded, such as a guitar player roaming around a stage, is moving in and out of view of respective content recording devices 110.

Respective content recordings on the content recording devices 110 can be conveyed during or after recording to one or more of the content recording devices 110 in the established synchronized recording relationship. Furthermore, respective content recordings can be conveyed to content server 150.

Referring back to FIG. 2, recording marker component 230 generates one or more markers for synchronization of recordings between content recording device 110 and other content recording devices 110 with which a synchronized recording relationship has been established. For example, recording marker component 230 can generate one marker that is communicated to content recording device 110 and other content recording devices 110 with instructions to embed the marker in their respective recordings. In another example, recording marker component 230 can generate markers periodically that are communicated to content recording device 110 and other content recording devices 110 with instructions to embed the markers in their respective recordings. For example, given that recordings on respective content recording devices 110 can begin and end at different times, periodic embedding of markers allows for increasing points in time where respective recordings can be synchronized. In a non-limiting example, a marker can include, an audible marker (e.g. an audible signal inserted into an audio portion of the recording), a visual marker (e.g. an visual element inserted into a visual portion of the recording), a code marker (e.g. programmatic code inserted into the data stream/file of the recording), or any other suitable mechanism that can be embedded in content recordings to allow for synchronization between said content recordings. It is to be appreciated that multiple types of markers can be employed for a set of synchronized content recordings. For example, periodic embedding of markers can cycle amongst audible marker, visual marker, or code marker. However, a marker meant for time synchronization at a common point in time between content recordings can be the same on each of the content recordings for later matching during playback or combining of synchronized content recordings.

Continuing with reference to FIG. 2, metadata component 240 generates metadata to associate with recordings on content recording device 110. It is to be appreciated that metadata can be automatically generated using artificial intelligence algorithms, using internal and external information sources and devices by metadata component 240, manually specified by a user associated with the recording, or using any suitable process for generating metadata. In a non-limiting example, metadata can include timestamps, source clock for timestamp, type of a user identity or account information associated with a user who recorded the content, user specified description of the recording, a type of content, geographic location information associated with the recording (e.g., using global positioning system (GPS), cellular tower information, Internet Protocol location resolution, or any other suitable geo-location mechanism), source of the content, type of device used to generate the content, formatting process employed to generate the content, or filters applied to the content. Additionally, metadata can include video, audio, image, or text parameters of the content. In a non-limiting example, a video recording can include title, year, language, description, cast, parental rating, length, video format, resolution, aspect ratio, audio format, etc. In another non-limiting example, a musical recording can include metadata such as source, title, artist, album, year, language, track genre, length, composer, lyrics, parental rating, album art, format, bit rate, sampling rate, bits per sample, number of content streams, audio codec, etc. One skilled in the art would readily recognize that, based on the type of content, there are well known metadata types that are conventionally associated. However, the information is not limited to only such traditional metadata types. Any suitable type of information can be associated with the content as metadata. It is to be appreciated that other content recording devices 110 in the established synchronized recording relationship can also recorded metadata for their respective recordings. Furthermore, content recording device 110 can communicate metadata to the other content recording devices 110 for association with their respective content recordings. In a non-limiting example, information that allows for identification of content recordings that were part of an established synchronized recording relationship can be communicated as metadata. The metadata can be employed by content server 150 (described below), for example, to assist in locating or matching content.

Respective content recording devices 110 can convey their content recordings and any information associated with their content recordings to content server 150.

Content Server

Figure 4:
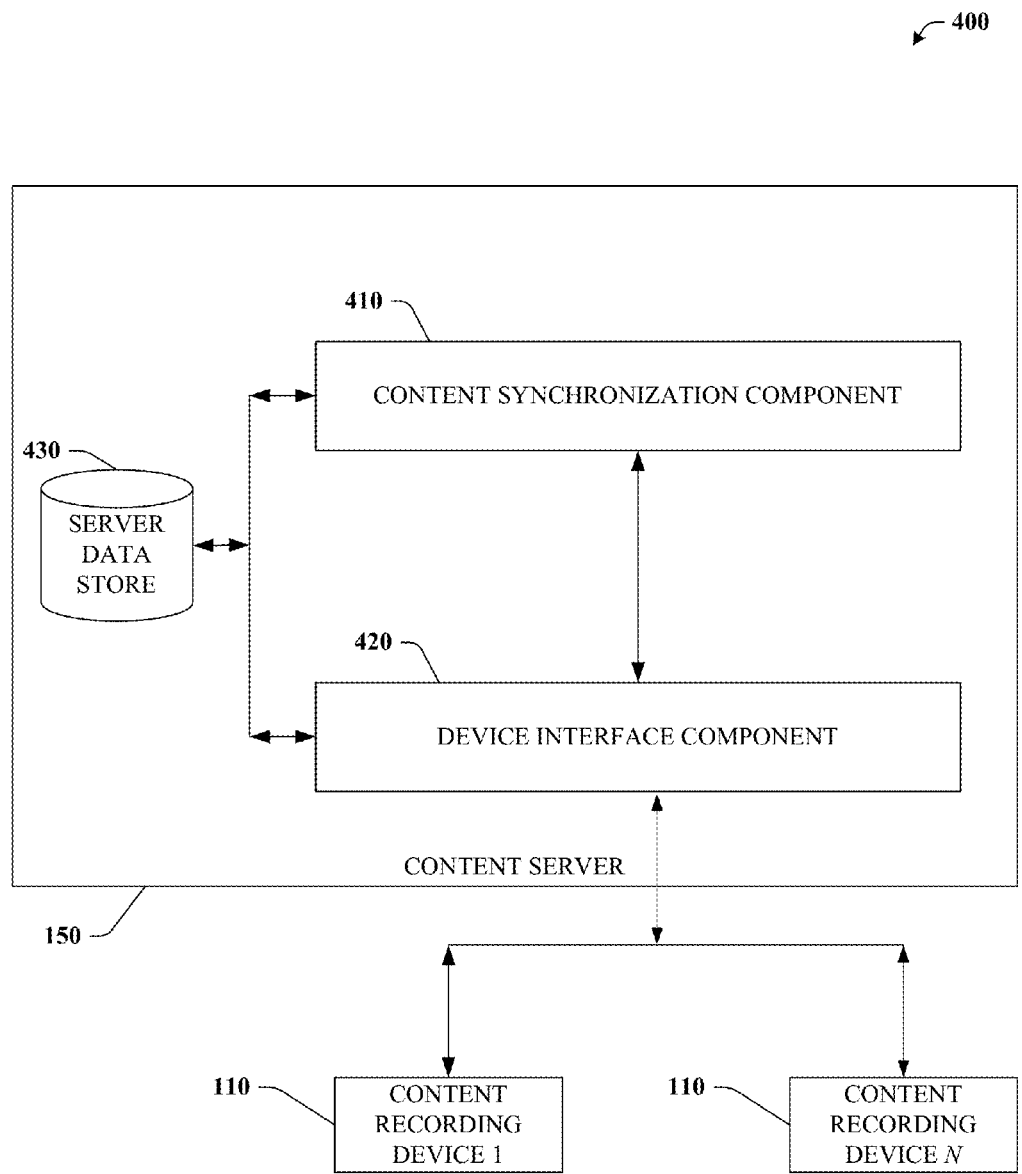
FIG. 4 illustrates a block diagram of an exemplary non-limiting content server that can access and synchronize recordings in accordance with an implementation of this disclosure.

Referring to FIG. 4, content server 150 includes content synchronization component 410 that synchronizes content recordings. In addition, content server 150 can include a device interface component 420 that interacts with content recording devices to send and/or receive information related to content recordings. Additionally, content recording server 120 includes a server data store 430 that can store content, as well as, data generated or received by content server 150, content synchronization component 410, and device interface component 420. Server data store 430 can be stored on any suitable type of storage device, non-limiting examples of which are illustrated with reference to FIGS. 14 and 15. Furthermore, while FIG. 4 depicts two content recording devices 110, any suitable number N, where N is an integer, of content recording devices 110 can interact with content server 150 concurrently. While content server 150 can interact directly with content recording devices 110 to receive content recordings, it is to be appreciated that content server 150 does not need to interact with any content recording devices 110 to perform some functions described below. For example, content server 150 can access content recordings in a local library or a remote library not located on a content recording device 110 to perform synchronization on a subset of the content recordings. Moreover, content server 150 can also be a content recording device 110 as discussed above.

Continuing with reference to FIG. 4, device interface component 420 can receive content recordings from one or more content recording devices 110. The content recordings can be received with specification of permissions, markers, metadata as discussed above, as well as any other suitable information related to the content recordings. Furthermore, device interface component 420 can store the content recordings according to the specified permissions, such as in global storage location or a specific account on the content server 150. Additionally, device interface component 420 can manage accessing, editing, or distribution of the content recordings according to the specified permissions.

Figure 5:
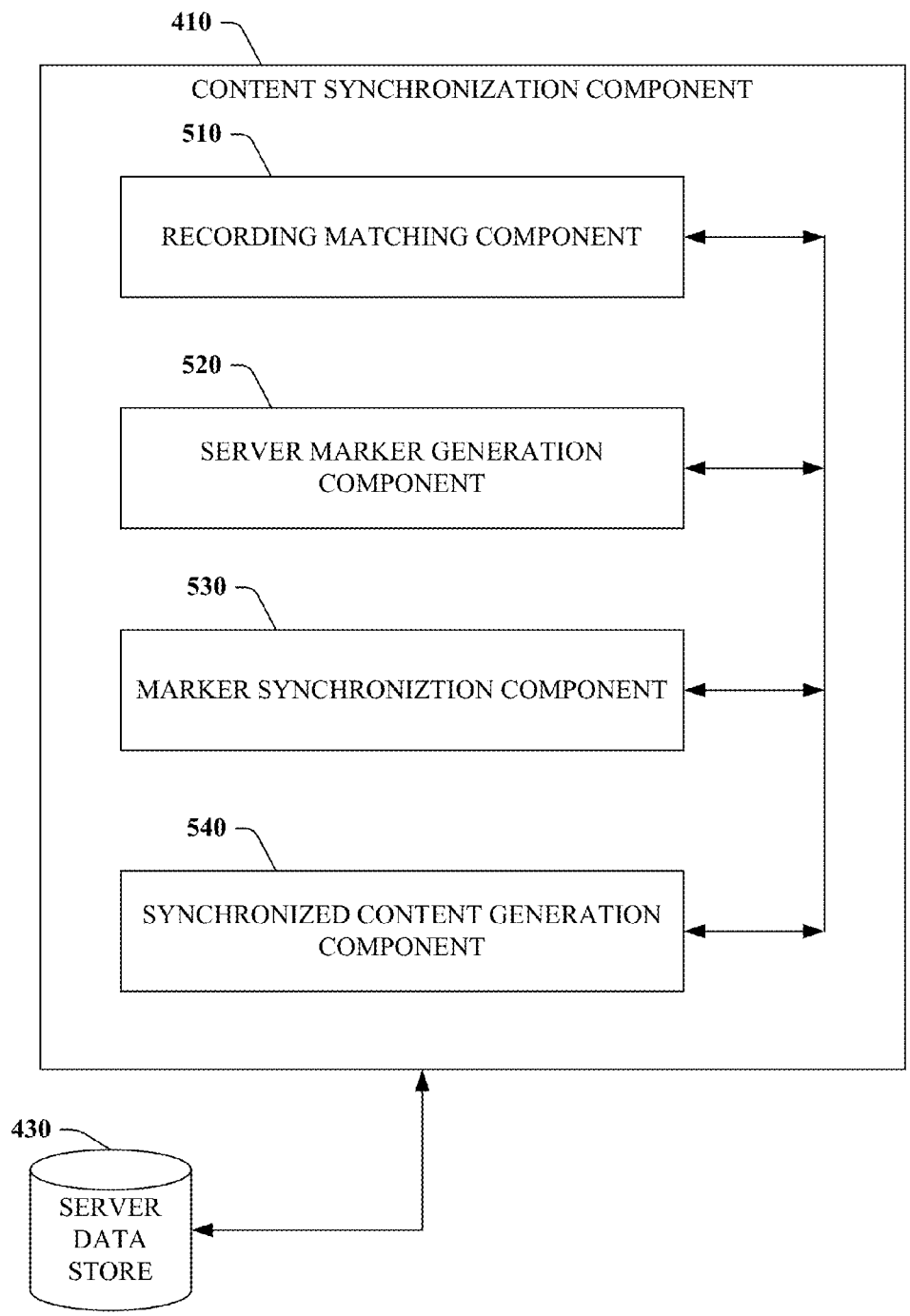
FIG. 5 illustrates a block diagram of an exemplary non-limiting content synchronization component that synchronizes content recordings received or accessed by a content server in accordance with an implementation of this disclosure.

Referring to FIG. 5, content synchronization component 410 synchronizes content recordings received or accessed by content server 150. Content synchronization component 410 includes recording matching component 510 that identifies matching content recordings. Content synchronization component 410 also includes server marker generation component 520 that generates markers to embed in content recordings. In addition, content synchronization component 410 includes marker synchronization component 530 that synchronizes markers between respective content recordings. Moreover, content synchronization component 410 includes synchronized content generation component 540 that generates synchronized content from a plurality of matching content recordings.

Recording matching component 510 can employ metadata associated with a recording or generate additional metadata in order to identify content recordings that are associated with a common event. For example, recording matching component 510 can compare metadata, such as by using algorithms, criteria, or thresholds, from content recording 1 with content recordings 2 through M, where M is an integer of 2 or greater, to determine if any of content recordings 2 through M are associated with a common event in content recording 1. In a non-limiting example, recording matching component 510 can determine if respective geographic locations associated with content recordings are within a threshold distance from each other, or if respective timestamps associated with content recordings are within a threshold time from each other, or if respective textual descriptions associated with a content recordings contains common terms (e.g. location, artist name, venue, event name, etc.). It is to be appreciated that any metadata can be compared between content recordings using any suitable matching mechanism. Furthermore, recording matching component 510 can analyze a content recording to generate metadata to associate thereto. For example, recording matching component 510 can perform a visual analysis to recognize objects in the images, such as people, faces, clothing, buildings, cars, a stage, a venue, road signs, or any other suitable visual object that can be employed to generate metadata for content recording matching to a common event. In another example, recording matching component 510 can perform an audio analysis to recognize audio signals, such as music, voices, vehicles, crowd cheers, city clock bell, or any other suitable sound that can be employed to generate metadata for content recording matching to a common event. It is to be appreciated that metadata can also include fingerprints generated from visual or audio analysis.

Continuing with reference to FIG. 5, server marker generation component 520 can analyze a content recording to identify elements of the recording that can be used for time synchronization between content recordings. Server marker generation component 520 can employ visual analysis to recognize objects in the frame images, such as people, faces, clothing, buildings, cars, a stage, a venue, road signs, or any other suitable visual object that can be employed for content recording time synchronization. In addition, server marker generation component 520 can estimate relative position of objects in relation to each other in each frame. For example, in a recording of a concert event, the position of a singer in the band in relation to the other members of the band, equipment, and a stage can be useful as a marker because analysis of another matching content recording can allow for identification of a point in the other recording where the singer in the band is in the same or within a threshold position relative to the other members of the band, equipment, and stage. Server marker generation component 520 can also perform an audio analysis to recognize audio signals, such as music, voices, vehicles, crowd cheers, city clock bell, or any other suitable sound that can be employed to generate metadata for content recording time synchronization. For example, a city clock bell ringing would be useful as marker because audio analysis of another matching content recording can allow for identification of the city clock bell ringing in the other matching content recording. Server marker generation component 520 can tag a content recording with respective markers at locations in the recording where visual objects or audio signals that can be used for time synchronization between content recordings.

Marker synchronization component 530 can compare markers between matching content recordings to identify matching markers. For example, markers that were embedded by content recording devices 110 in an established synchronized recording relationship will have unique markers for each common point in time to which a marker was embedded. As such, marker synchronization component 530 can easily identify unique markers for each common point in time amongst matching content recordings from content recording devices 110 in an established synchronized recording relationship. In another example, where all or some of the matching content recordings are not from content recording devices 110 in an established synchronized recording relationship, matching of markers tagged by server marker generation component 520 can be performed. For example, audio or video analysis of the portions of the respective matching content recordings associated with markers can be performed using a suitable matching mechanism to identify matching portions of the respective matching content recordings. After identifying matching markers or portions of respective matching content recordings, marker synchronization component 530 can perform time synchronization between matching content recordings. For example, marker synchronization component 530 can determine respective time offset(s) between matching markers or portions of respective pairs of matching content recordings and associate the respective time offsets to the respective pairs of the matching content recordings. In another example, marker synchronization component 530 can normalize timestamps in matching content recordings to a common time reference, such as in a non-limiting example the content server 150 clock, based upon the determined time offsets. It is to be appreciated that any suitable mechanism for recording differences in clocks between matching content recordings or normalization of timestamps in matching content recordings can be employed. Moreover, marker synchronization component 530 can also attempt to identify offsets in timestamps between matching content recordings, for example, using metadata defining a source clock for a timestamp. Comparing two source clocks can allow for identification of on offset between respective timestamps of two content recordings.

Figure 8A:
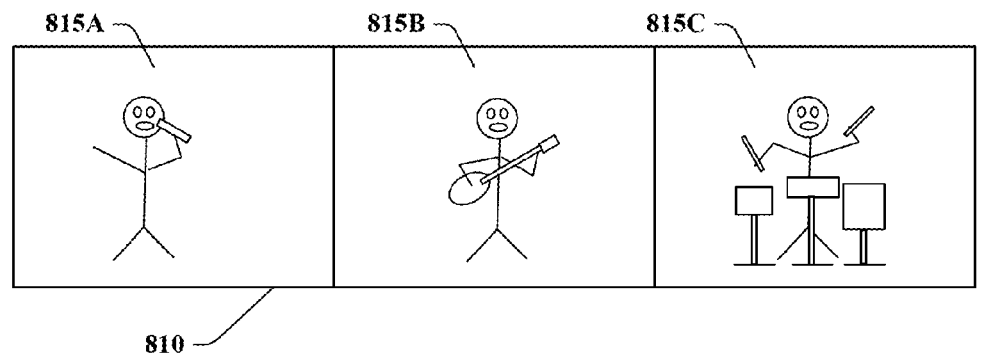
FIG. 8A illustrates a block diagram of an exemplary non-limiting synchronized content generated using matching content recordings of different members of a band in accordance with an implementation of this disclosure.
Figure 8B:
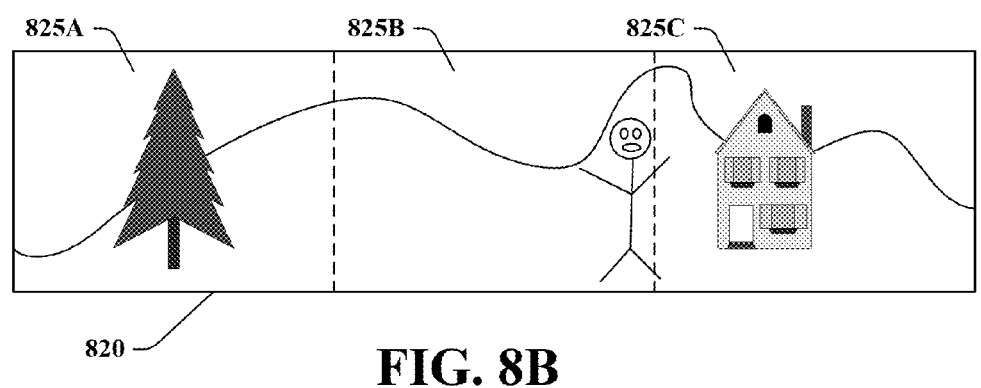
FIG. 8B illustrates a block diagram of an exemplary non-limiting synchronized content generated using matching content recordings of landscape scene in accordance with an implementation of this disclosure.

With continued reference to FIG. 5, synchronized content generation component 540 can generate synchronized content from a plurality of matching content recordings. For example, matching content recordings with normalized timestamps or associated time offsets can be temporally aligned to create new synchronized content. FIG. 8A illustrates an example synchronized content 810 generated using matching content recordings 815A, 815B, 815C of different members of a band. The synchronized content 810 concurrently depicts matching content recordings 815A, 815B, 815C in a time synchronized manner. FIG. 8B depicts an example synchronized content 820 generated using matching content recordings 825A, 825B, 825C of a landscape scene. The synchronized content 820 is a panoramic video generated by stitching together the time synchronized matching content recordings 825A, 825B, 825C. In another example, not shown, time synchronized matching content recordings can be combined to form a three-dimensional video, three-dimensional video that can be rotated about an axis, a three dimensional video that can be rotated about a point omni-directionally, or any other suitable content that can be formed using time synchronized matching content recordings.

Figure 9A:
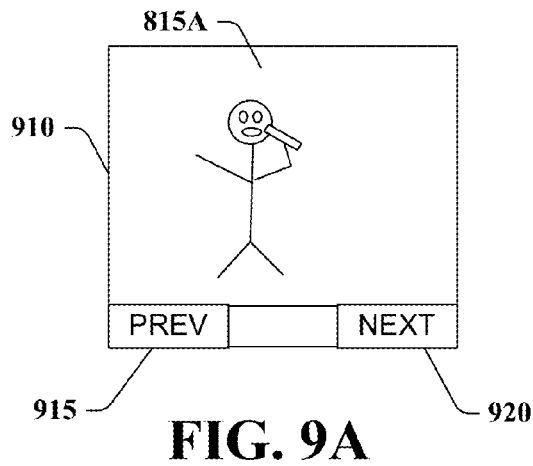
FIGS. 9A-C illustrate block diagrams of an exemplary non-limiting window that allows for presenting matching content recordings and switching amongst them at an equivalent point in time using a previous button and next button in accordance with an implementation of this disclosure.
Figure 9B:
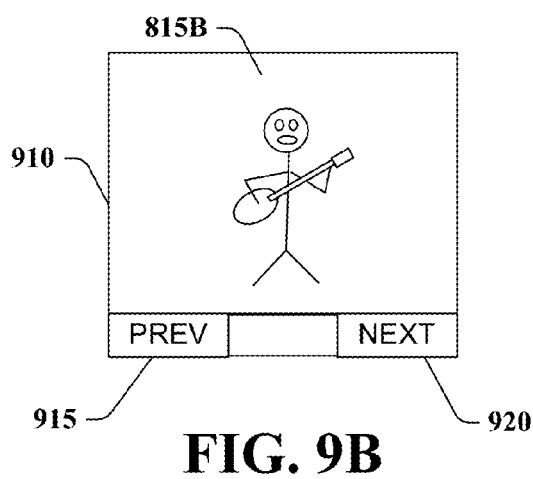
Figure 9C:
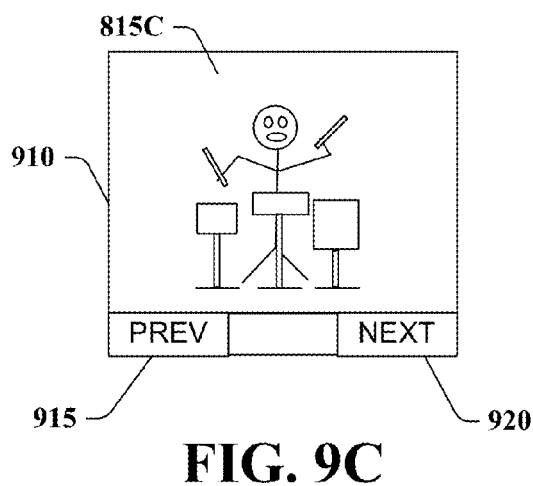

Furthermore, content synchronization component 410 can present matching content recordings in a time synchronized manner without combining them into newly generated synchronized content. For example, referring back to FIG. 8A., content synchronization component 410 can present matching content recordings 815A, 815B, 815C using three separate windows (not shown) that run the respective matching content recordings in a time synchronized manner. In another example, referring to FIGS. 9A-C, content synchronization component 410 can present a window 910 that allows for presenting matching content recordings 815A, 815B, or 815C and switching amongst them at an equivalent point in time using previous button 915 and next button 920. It is to be appreciated that any suitable mechanism that allows for selection of which matching content recording 815A, 815B, or 815C to currently view in window 910 can be employed.

FIGS. 10-13 illustrate various methods in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Figure 10:
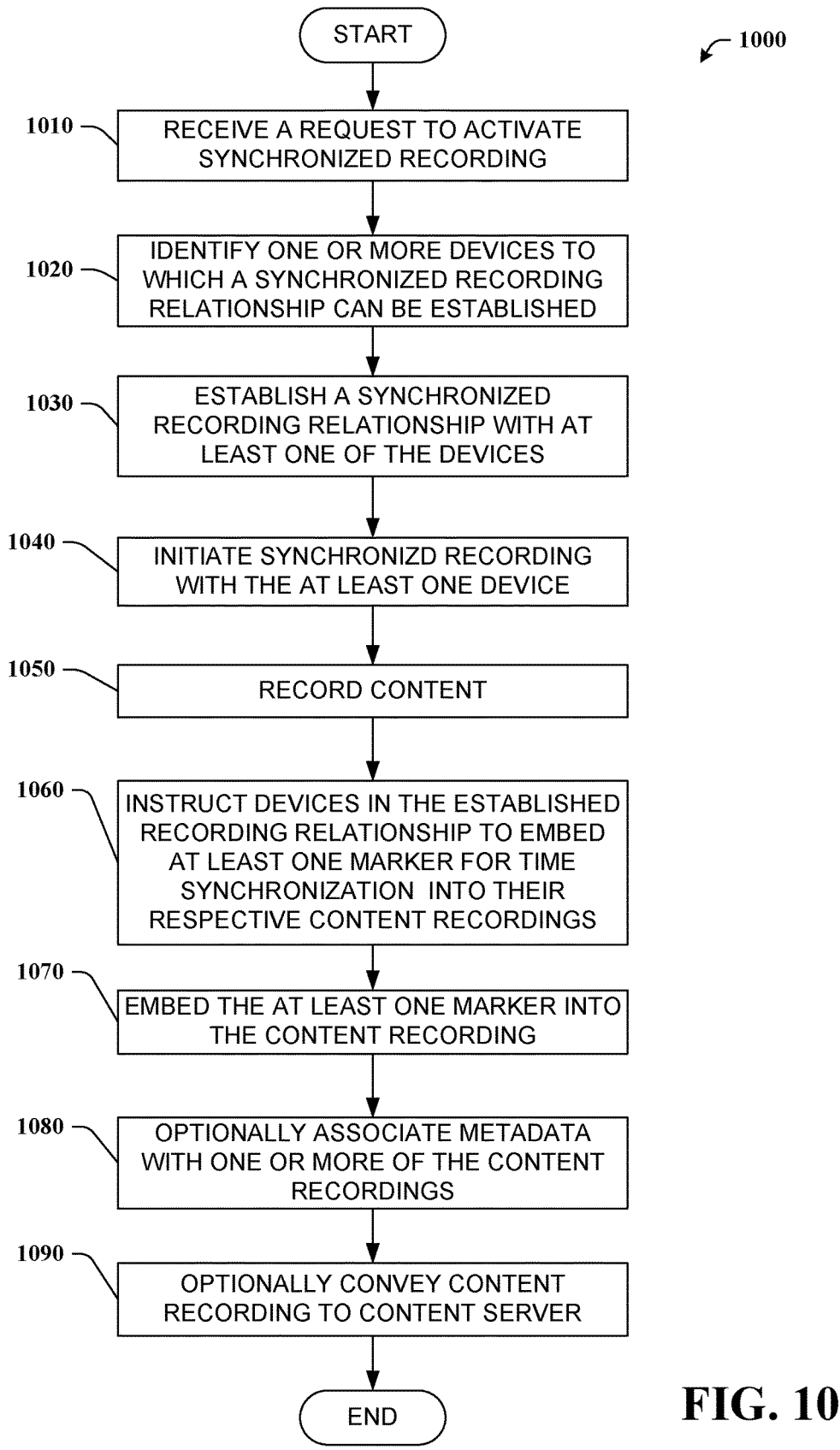
FIG. 10 illustrates an exemplary non-limiting flow diagram for a content recording device to establish a synchronized recording relationship with other content recording devices in accordance with an implementation of this disclosure.

Referring to FIG. 10, an exemplary method 1000 for a content recording device 110 to establish a synchronized recording relationship with other content recording devices 110 is depicted. At reference numeral 1010, a request to activate a synchronized recording is received (e.g., by a user interface component 210, device synchronization component 220, content recording component 120, or content recording device 110). At reference numeral 1020, one or more other content recording devices 110 with which a synchronized recording relationship can be established are identified (e.g., by a device identification component 310, device synchronization component 220, content recording component 120, content recording device 110, or interface component 130). At reference numeral 1030, a synchronized recording relationship is established with at least one of the other content recording devices 110 (e.g., by a device recording connection component 320, device synchronization component 220, content recording component 120, content recording device 110, or interface component 130). At reference numeral 1040, synchronized recording is initiated amongst the content recording device 110 and the at least one other content recording device 110 in the established synchronized recording relationship (e.g., by a synchronized recording component 330, device synchronization component 220, content recording component 120, content recording device 110, or interface component 130). At reference numeral 1050, content recording device 110 records content (e.g., by a synchronized recording component 330, device synchronization component 220, content recording component 120, or content recording device 110). At reference numeral 1060, the content recording device 110 and the at least one other content recording device 110 in the established synchronized recording relationship are instructed to embed at least one marker for time synchronization into their respective content recordings (e.g., by a synchronized recording component 330, device synchronization component 220, content recording component 120, content recording device 110, or interface component 130).

At reference numeral 1070, content recording device 110 embeds the at least one marker in its content recording (e.g., by a synchronized recording component 330, device synchronization component 220, content recording component 120, or content recording device 110). At reference numeral 1080, content recording device 110 can perform an optional act of associating metadata with its content recording and/or instruction the at least one other content recording device 110 in the established synchronized recording relationship to associate metadata with their respective content recordings (e.g., by a synchronized recording component 330, device synchronization component 220, content recording component 120, content recording device 110, or interface component 130). At reference numeral 1090, content recording device 110 can perform the optional act of conveying its content recording to content server 150, for example when content recording device 110 is not also performing as content server 150. (e.g., by a synchronized recording component 330, device synchronization component 220, content recording component 120, content recording device 110, or interface component 130).

Figure 11:
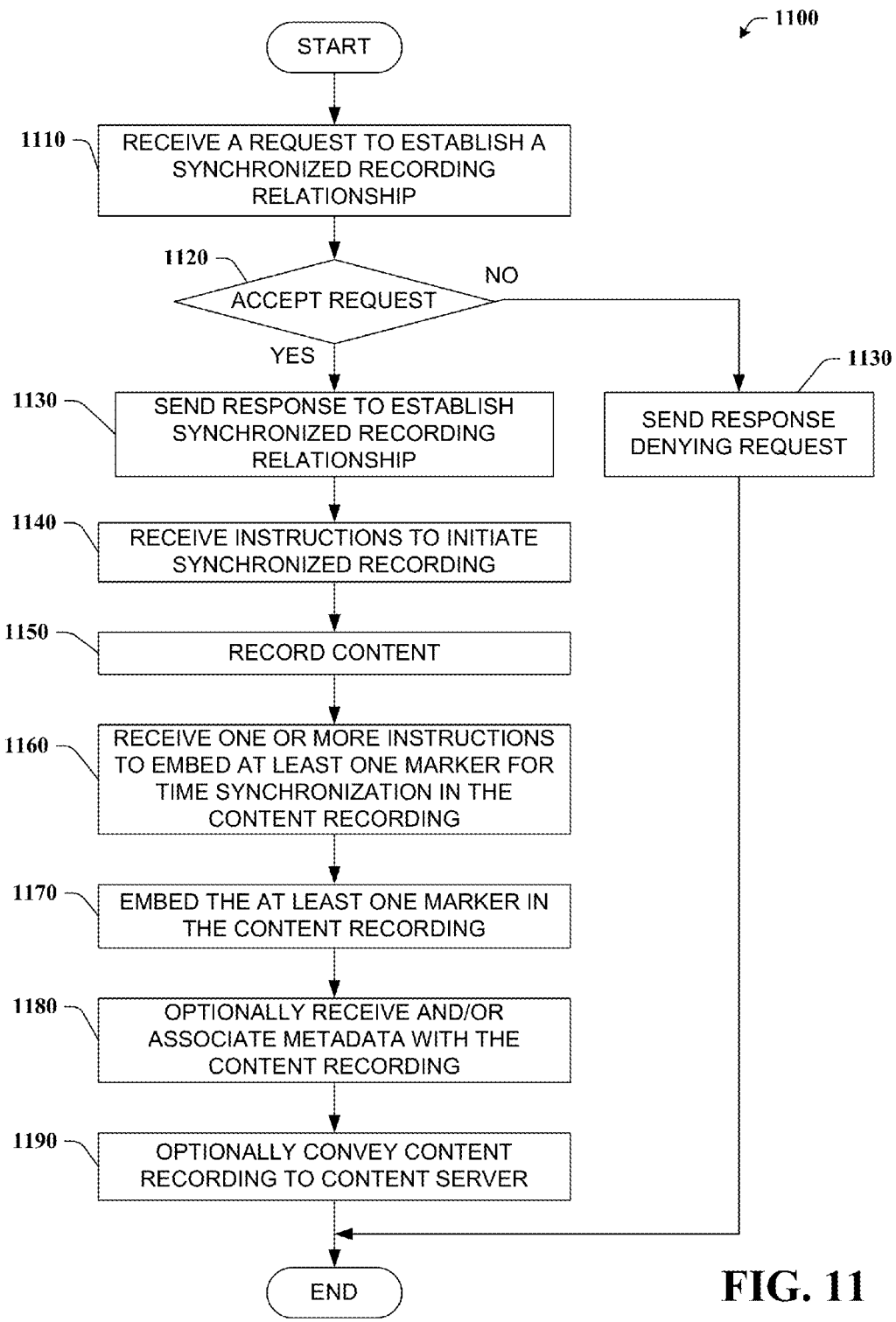
FIG. 11 illustrates an exemplary non-limiting flow diagram for a content recording device to establish a synchronized recording relationship in accordance with an implementation of this disclosure.

Referring to FIG. 11, an exemplary method 1100 for a content recording device 110 to establish a synchronized recording relationship is depicted. At reference numeral 1110, a request to activate a synchronized recording is received (e.g., by a device recording connection component 320, device synchronization component 220, content recording component 120, content recording device 110, or interface component 130). At reference numeral 1120, a determination is made whether to establish the synchronized recording relationship. (e.g., by a device recording connection component 320, device synchronization component 220, content recording component 120, content recording device 110, or interface component 130). If the determination at 1120 is "NO" meaning that a determination has been made not to establish the synchronized recording relationship, the method proceeds to element 1135. If the determination at 1120 is "YES" meaning that a determination has been made to establish the synchronized recording relationship, the method proceeds to element 1130. At reference numeral 1135, a response is sent to the request denying the request (e.g., by a device recording connection component 320, device synchronization component 220, content recording component 120, content recording device 110, or interface component 130). At reference numeral 1130, a response is sent to the request accepting the request and the synchronized recording relationship is established (e.g., by a device recording connection component 320, device synchronization component 220, content recording component 120, content recording device 110, or interface component 130). At reference numeral 1140, instructions are received to initiate synchronized recording of content (e.g., by device synchronization component 220, content recording component 120, content recording device 110, interface component 130). At reference numeral 1150, content is recorded (e.g., by device synchronization component 220, content recording component 120, or content recording device 110). At reference numeral 1160, instructions are received to embed at least one marker for time synchronization in the content recording (e.g., by device synchronization component 220, content recording component 120, content recording device 110, or interface component 130). At reference numeral 1170, the at least one marker is embedded in content recording (e.g., by device synchronization component 220, content recording component 120, content recording device 110, or interface component 130). At reference numeral 1180, an optional act can be performed of receiving or generating metadata and associating the metadata with the content recordings (e.g., by device synchronization component 220, content recording component 120, content recording device 110, or interface component 130). At reference numeral 1190, an optional act can be performed of conveying the content recording to content server 150, for example when content recording device 110 is not also performing as content server 150 (e.g., by device synchronization component 220, content recording component 120, content recording device 110, or interface component 130).

Figure 12:
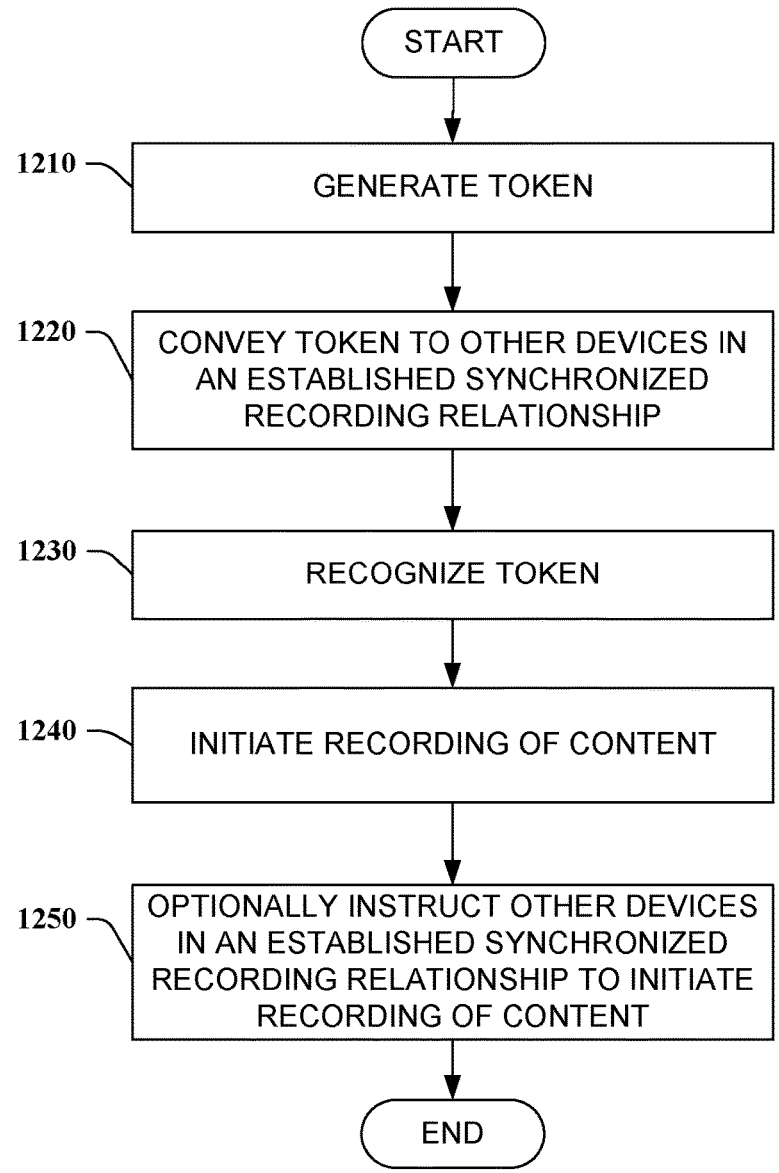
FIG. 12 illustrates an exemplary non-limiting flow diagram for a content recording device to initiate recording of content in accordance with an implementation of this disclosure.

Referring to FIG. 12, an exemplary method 1200 for a content recording device 110 to initiate recording of content is depicted. At reference numeral 1210, a token is generated or captured (e.g., by a device synchronization component 220, content recording component 120, or content recording device 110). At reference numeral 1220, the token is conveyed to other content recording devices 110 in an established synchronized recording relationship with the content recording device 110 (e.g., by a device synchronization component 220, content recording component 120, content recording device 110, or interface component 130). At reference numeral 1230, a token is recognized (e.g., by a device synchronization component 220, content recording component 120, or content recording device 110). At reference numeral 1240, recording of content is initiated in response to recognizing the token (e.g., by a device synchronization component 220, content recording component 120, or content recording device 110). At reference numeral 1250, an optional act can be performed of instructing the other content recording devices in an established synchronized recording relationship to initiate recording of content (e.g., by a device synchronization component 220, content recording component 120, content recording device 110, or interface component 130).

Figure 13:
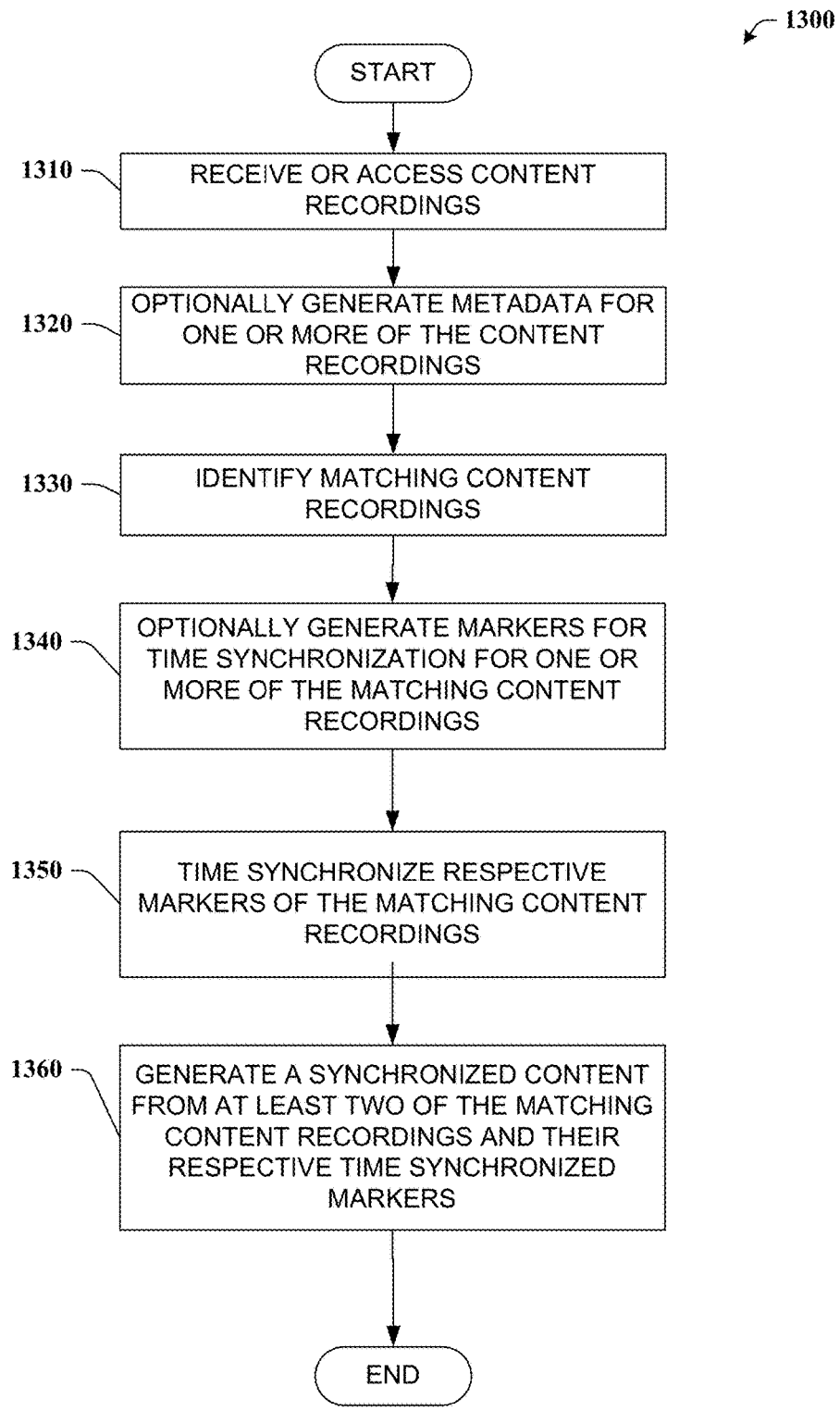
FIG. 13 illustrates an exemplary non-limiting flow diagram for a content recording device to initiate recording of content using a token in accordance with an implementation of this disclosure.

Referring to FIG. 13, an exemplary method 1300 for a content recording device 110 to initiate recording of content using a token is depicted. At reference numeral 1310, content recordings are received or accessed (e.g., by a content synchronization component 410, content server 150, or device interface component 420). At reference numeral 1320, an optional act can be performed of generating metadata for the content recordings (e.g., by a recording matching component 510, content synchronization component 410 or content server 150). At reference numeral 1330, matching content recordings are identified (e.g., by a recording matching component 510, content synchronization component 410 or content server 150). At reference numeral 1340, an optional act can be performed of generating marker for time synchronization for one or more of the matching content recordings (e.g., by a server marker generation component 520, content synchronization component 410 or content server 150). At reference numeral 1350, respective markers of the matching content recordings are time synchronized (e.g., by a marker synchronization component 530, content synchronization component 410 or content server 150). At reference numeral 1360, a synchronized recording is generated from at least two of the matching content recordings and their respective time synchronized markers (e.g., by a synchronized content generation component 540, content synchronization component 410 or content server 150).

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 14:
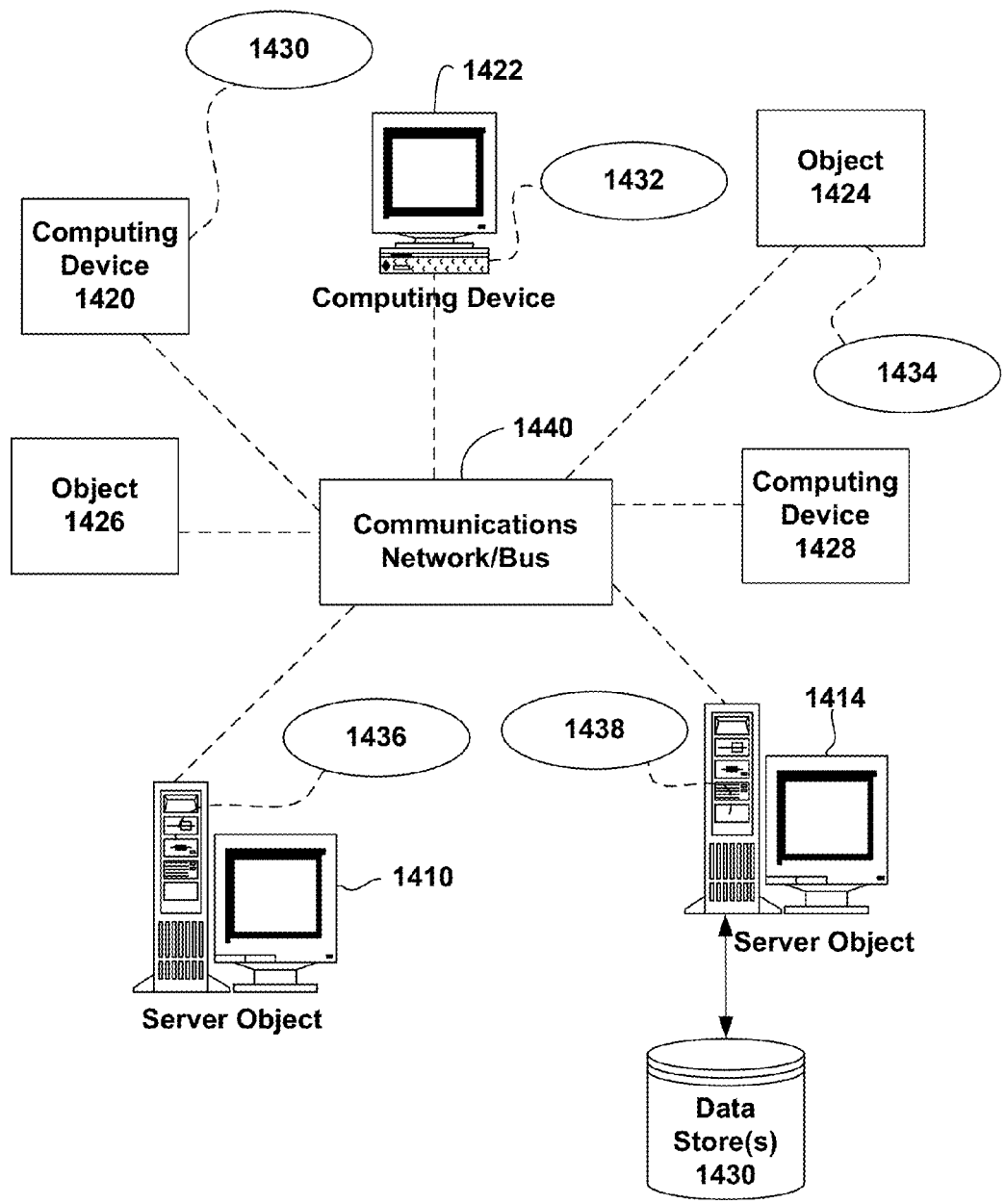
FIG. 14 illustrates a block diagram of an exemplary non-limiting networked environment in which the various embodiments can be implemented.

FIG. 14 provides a schematic diagram of an exemplary networked or distributed computing environment. The distributed computing environment comprises computing objects 1410, 1412, etc. and computing objects or devices 1420, 1422, 1424, 1426, 1428, etc., which may include programs, methods, data stores, programmable logic, etc., as represented by applications 1430, 1432, 1434, 1436, 1438. It can be appreciated that computing objects 1410, 1412, etc. and computing objects or devices 1420, 1422, 1424, 1426, 1428, etc. may comprise different devices, such as personal digital assistants (PDAs), audio/video devices, mobile phones, MP3 players, personal computers, laptops, tablets, etc.

Each computing object 1410, 1412, etc. and computing objects or devices 1420, 1422, 1424, 1426, 1428, etc. can communicate with one or more other computing objects 1410, 1412, etc. and computing objects or devices 1420, 1422, 1424, 1426, 1428, etc. by way of the communications network 1440, either directly or indirectly. Even though illustrated as a single element in FIG. 14, network 1440 may comprise other computing objects and computing devices that provide services to the system of FIG. 14, and/or may represent multiple interconnected networks, which are not shown. Each computing object 1410, 1412, etc. or computing objects or devices 1420, 1422, 1424, 1426, 1428, etc. can also contain an application, such as applications 1430, 1432, 1434, 1436, 1438, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 14, as a non-limiting example, computing objects or devices 1420, 1422, 1424, 1426, 1428, etc. can be thought of as clients and computing objects 1410, 1412, etc. can be thought of as servers where computing objects 1410, 1412, etc. provide data services, such as receiving data from client computing objects or devices 1420, 1422, 1424, 1426, 1428, etc., storing of data, processing of data, transmitting data to client computing objects or devices 1420, 1422, 1424, 1426, 1428, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1440 is the Internet, for example, the computing objects 1410, 1412, etc. can be Web servers, file servers, media servers, etc. with which the client computing objects or devices 1420, 1422, 1424, 1426, 1428, etc. communicate via any of a number of known protocols, such as the hypertext transfer protocol (HTTP). Objects 1410, 1412, etc. may also serve as client computing objects or devices 1420, 1422, 1424, 1426, 1428, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the computer described below in FIG. 15 is but one example of a computing device that can be employed with implementing one or more of the systems or methods shown and described in connection with FIGS. 1-13. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 15 thus illustrates an example of a suitable computing system environment 1500 in which one or aspects of the embodiments described herein can be implemented, although as made clear above, the computing system environment 1500 is only one example of a suitable computing environment and is not intended to suggest any limitation as to scope of use or functionality. Neither is the computing environment 1500 be interpreted as having any dependency or requirement relating to any one or combination of components illustrated in the exemplary operating environment 1500.

With reference to FIG. 15, an exemplary computing device for implementing one or more embodiments in the form of a computer 1510 is depicted. Components of computer 1510 may include, but are not limited to, a processing unit 1520, a system memory 1530, and a system bus 1522 that couples various system components including the system memory to the processing unit 1520.

Computer 1510 typically includes a variety of computer readable media and can be any available media that can be accessed by computer 1510. The system memory 1530 may include computer storage media in the form of volatile and/or nonvolatile memory such as read only memory (ROM) and/or random access memory (RAM). By way of example, and not limitation, system memory 1530 may also include an operating system, application programs, other program modules, and program data.

A user can enter commands and information into the computer 1510 through input devices 1540, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1510. A monitor or other type of display device is also connected to the system bus 1522 via an interface, such as output interface 1550. In addition to a monitor, computers can also include other peripheral output devices such as speakers and a printer, which may be connected through output interface 1550.

The computer 1510 may operate in a networked or distributed environment using logical connections to one or more other remote computers, such as remote computer 1570. The remote computer 1570 may be a personal computer, a server, a router, a network PC, a peer device or other common network node, or any other remote media consumption or transmission device, and may include any or all of the elements described above relative to the computer 1510. The logical connections depicted in FIG. 15 include a network 1572, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata or inferring topics of interest to users), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method, comprising: receiving, by a processor of a first content recording device, input indicating a synchronized recording request; and in response to receiving the synchronized recording request: identifying, by the first content recording device, a plurality of other content recording devices that meet at least one filter criterion and that are capable of a synchronized recording relationship with the first content recording device; selecting, by the first content recording device, a second content recording device from the plurality of other content recording devices; establishing, by the first content recording device, the synchronized recording relationship with the second content recording device; periodically inserting, by the first content recording device, a first set of markers into a first recording at a first set of points of time while the first recording is being captured by the first content recording device, the first set of markers being of different types, wherein the first set of markers comprises a first content object inserted at a first point in time of the first set of points of time within the first recording; and instructing, by the first content recording device, the second content recording device to periodically insert a second set of markers into a second recording at a second set of points of time while the second recording is being captured by the second content recording device, the second set of markers being of different types, wherein the second set of markers comprises a second content object inserted at a second point in time of the second set of points of time within the second recording, the first content object and the second content object being a first type of marker, the second point in time within the second recording and the first point in time within the first recording correspond to a common point in time within the first recording and the second recording, and the first recording and the second recording are to be temporally aligned in view of the first content object and the second content object to display synchronized content comprising the first recording and the second recording.

2. The method of claim 1, further comprising in response to the establishing the synchronized recording relationship with the second content recording device:
  initiating, by the first content recording device, the first recording; and
  instructing; by the first content recording device, the second content recording device to initiate the second recording.

3. The method of claim 1, wherein the first content object is at least one of an audible marker or a visual marker, and wherein the first set of markers and the second set of markers are to be used in presenting the first recording and the second recording concurrently in a merged presentation.

4. The method of claim 1, wherein the at least one filter criterion comprises at least one of a geographical parameter, a recording parameter, a user relationship parameter, or a device type.

5. The method of claim 4, wherein the at least one filter criterion is specified by a user associated with the first content recording device.

6. The method of claim 1 further comprising ranking the plurality of other content recording devices based on the at least one filter criterion, wherein the selecting of the second content recording device from the plurality of other content recording devices is based on the ranking.

7. The method of claim 1, further comprising associating metadata to at least one of the first recording or the second recording, wherein the metadata identifies the synchronized recording relationship between the first content recording device and the second content recording device.

8. A first content recording device, comprising: a processor, communicatively coupled to a memory that stores computer-executable components, that executes or facilitates execution of the computer-executable components, comprising: an interface component to receive input indicating a synchronized recording request; and a content recording component to, in response to receiving the synchronized recording request: identify a plurality of other content recording devices that meet at least one filter criterion and that are capable of a synchronized recording relationship with the first content recording device; select a second content recording device, from the plurality of other content recording devices; establish the synchronized recording relationship with the second recording device; periodically insert a first set of markers into a first recording at a first set of points of time while the first recording is being captured by the first content recording device, the first set of markers being of different types, wherein the first set of markers comprises a first content object inserted at a first point in time of the first set of points of time within the first recording; and instruct the second content recording device to periodically insert a second set of markers into a second recording at a second set of points of time while the second recording is being captured by the second content recording device, the second set of markers being of different types, wherein the second set of markers comprises a second content object inserted at a second point in time of the second set of points of time within the second recording, the first content object and the second content object being a first type of marker, the first point in time within the first recording and the second point in time within the second recording correspond to a common point in time within the first recording and the second recording, and the first recording and the second recording are to be temporally aligned in view of the first content object and the second content object to display synchronized content comprising the first recording and the second recording.

9. The first content recording device of claim 8, wherein the content recording component is further to, in response to establishing the synchronized recording relationship with the second content recording device:
  initiate the first recording; and
  instruct the second content recording device to initiate the second recording.

10. The first content recording device of claim 8, wherein the first content object is at least one of an audible marker or a visual marker, and wherein the first set of markers and the second set of markers are to be used in presenting the first recording and the second recording concurrently in a merged presentation.

11. The first content recording device of claim 8, wherein the at least one filter criterion comprises at least one of a geographical parameter, a recording parameter, a user relationship parameter, or a device type.

12. The first content recording device of claim 11, wherein the at least one filter criterion is specified by a user associated with the first content recording device.

13. The first content recording device of claim 8, wherein the content recording component is further to, in response to establishing the synchronized recording relationship with the second content recording device, rank the plurality of other content recording devices based on the at least one filter criterion, wherein the content recording component is to select the second content recording device from the plurality of other content recording devices based on ranking of the plurality of other content recording devices based on the at least one filter criterion.

14. The first content recording device of claim 8, wherein the content recording component is further to associate metadata to at least one of the first recording or the second recording, wherein the metadata identifies the synchronized recording relationship between the first content recording device and the second content recording device.

15. A non-transitory computer-readable medium having instructions stored thereon that, in response to execution, cause a first content recording device including a processor to perform operations comprising: receiving input indicating a synchronized recording request; and in response to receiving the synchronized recording request: identifying a plurality of other content recording devices that meet at least one filter criterion and that are capable of a synchronized recording relationship with the first content recording device; selecting a second content recording device from the plurality of other content recording devices; establishing the synchronized recording relationship with the second content recording device; periodically inserting a first set of markers into a first recording at a first set of points of time while the first recording is being captured by the first content recording device, the first set of markers being of different types, wherein the first set of markers comprises a first content object inserted at a first point in time of the first set of points of time within the first recording; and instructing the second content recording device to periodically insert a second set of markers into a second recording at a second set of points of time while the second recording is being captured by the second content recording device, the second set of markers being of different types, wherein the second set of markers comprises a second content object inserted at a second point in time of the second set of points of time within the second recording, the first content object and the second content object being a first type of marker, the second point in time within the second recording and the first point in time within the first recording correspond to a common point in time within the first recording and the second recording, and the first recording and the second recording are to be temporally aligned in view of the first content object and the second content object to display synchronized content comprising the first recording and the second recording.

16. The non-transitory computer-readable medium of claim 15, the operations further comprising in response to the establishing the synchronized recording relationship with the second content recording device:
   initiating the first recording; and
   instructing the second content recording device to initiate the second recording.

17. The non-transitory computer-readable medium of claim 15, wherein the first content object is at least one of an audible marker or a visual marker, and wherein the first set of markers and the second set of markers are to be used in presenting the first recording and the second recording concurrently in a merged presentation.

18. The non-transitory computer-readable medium of claim 15, wherein the at least one filter criterion comprises at least one of a geographical parameter, a recording parameter, a user relationship parameter, or a device type.

19. The non-transitory computer-readable medium of claim 18, wherein the at least one filter criterion is specified by a user associated with the first content recording device.

20. The non-transitory computer-readable medium of claim 15, the operations further comprising in response to the establishing the synchronized recording relationship with the second content recording device, ranking the plurality of other content recording devices based on the at least one filter criterion, wherein the selecting of the second content recording device from the plurality of other content recording devices is based on the ranking.

21. The non-transitory computer-readable medium of claim 15, the operations further comprising associating metadata to at least one of the first recording or the second recording, wherein the metadata identifies the synchronized recording relationship between the first content recording device and the second content recording device.

22. A first content recording device, comprising: a memory; and a processor, coupled to the memory, to: responsive to input indicating a synchronized recording request, identify a plurality of other content recording devices that meet at least one filter criterion and that are capable of a synchronized recording relationship with the first content recording device; select a second content recording device, from the plurality of other content recording devices; establish the synchronized recording relationship with the second content recording device; periodically insert a first set of markers into a first recording at a first set of points of time while the first recording is being captured by the first content recording device, the first set of markers being of different types, wherein the first set of markers comprises a first content object inserted at a first point in time of the first set of points of time within the first recording; and instruct the second content recording device to periodically insert a second set of markers into a second recording at a second set of points of time while the second recording is being captured by the second content recording device, the second set of markers being of different types, wherein the second set of markers comprises a second content object inserted at a second point in time of the second set of points of time within the second recording, the first content object and the second content object being a first type of marker, the second point in time within the second recording and the first point in time within the first recording correspond to a common point in time within the first recording and the second recording, and the first recording and the second recording are to be temporally aligned in view of the first content object and the second content object to display synchronized content comprising the first recording and the second recording.

23. The first content recording device of claim 22, wherein the processor is further to, upon establishing the synchronized recording relationship with the second content recording device:
   initiate the first recording; and
   instruct the second content recording device to initiate the second recording.

24. The first content recording device of claim 22, wherein the first content object is at least one of an audible marker or a visual marker, and wherein the first set of markers and the second set of markers are to be used in presenting the first recording and the second recording concurrently in a merged presentation.

25. The first content recording device of claim 22, wherein the at least one filter criterion comprises at least one of a geographical parameter, a recording parameter, a user relationship parameter, or a device type.

26. The first content recording of claim 25, wherein the at least one filter criterion is specified by a user associated with the first content recording device.

27. The first content recording device of claim 22, wherein the processor is further to, upon establishing the synchronized recording relationship with the second content recording device, rank the plurality of other content recording devices based on the at least one filter criterion, wherein the processor is to select the second content recording device from the plurality of other content recording devices based on ranking of the plurality of other content recording devices based on the at least one filter criterion.

* * * * *